United States Patent [19]
Borchers et al.

[11] Patent Number: 5,753,931
[45] Date of Patent: May 19, 1998

[54] OBJECT IMAGING DEVICE AND METHOD USING LINE STRIPING

[75] Inventors: Robert E. Borchers; Bruce J. Kilgore, both of Lake Oswego, Oreg.; Eric D. Rosenthal, Freehold, N.J.; David A. Boone, Seattle; Kenneth Birdwell, Belleview, both of Wash.

[73] Assignee: Nike, Inc., Beaverton, Oreg.

[21] Appl. No.: 501,869

[22] Filed: Jul. 13, 1995

[51] Int. Cl.$^6$ .......................... G01N 21/00; G01B 11/24
[52] U.S. Cl. .................. 250/559.22; 250/559.05; 356/376; 382/111; 382/321; 128/779
[58] Field of Search .......................... 250/208.1, 559.05, 250/559.06, 559.07, 559.08, 559.19, 559.22, 559.24, 559.26, 216, 234, 235, 236; 356/376; 33/3 R, 6, 511, 512, 515; 128/779; 382/255, 266, 286, 321, 128, 111

[56] References Cited

U.S. PATENT DOCUMENTS

| | | |
|---|---|---|
| 3,696,456 | 10/1972 | Dunham et al. |
| 3,966,326 | 6/1976 | Brull et al. |
| 4,227,813 | 10/1980 | Pirlet |
| 4,267,728 | 5/1981 | Manley et al. |
| 4,406,544 | 9/1983 | Takada et al. |
| 4,538,353 | 9/1985 | Gardner |
| 4,575,805 | 3/1986 | Moermann et al. |
| 4,600,016 | 7/1986 | Boyd et al. |
| 4,604,807 | 8/1986 | Bock et al. |

(List continued on next page.)

FOREIGN PATENT DOCUMENTS

| | | |
|---|---|---|
| 62-248078 A | 10/1987 | Japan |
| 05 306995 A | 11/1993 | Japan |
| 08 043299 A | 2/1996 | Japan |
| 652 586 A5 | 11/1985 | Switzerland |
| 1480-799-A | 5/1989 | U.S.S.R. |
| WO 90/05345 | 5/1990 | WIPO |
| WO 94/20020 | 9/1994 | WIPO |

OTHER PUBLICATIONS

"News Trends", Machine design, p. 27, Jun. 15, 1995.
"Real-Time Imaging of Moving Objects", Photonics Spectra, p. 20, May 1993.
"Computer Aided Design, Computer Aided Manufacture and Other Computer Aids in Prosthetics and Orthostics", by B. Kasson, Prosthetics and Orthotics International, vol. 9, No. 1, 1985, pp. 3–11.
"Sculptured Surfaces in Engineering and Medicine", by J.P. Duncan and S.G. Mair, Cambridge University Press, 1983.
"A Genrealized Approach to the Replication of Cylindrical Bodies With Compound Curvature", by C.G. Saunders and G.W. Vickers, Transactions of the ASME, Mar. 1984.
"Issues and Themes in Computer Aided Design for External Prosthetics and Orthotics", by M. Lord and D. Jones, J. Biomed. Eng., vol. 10, Nov. 1988.

Primary Examiner—Edward P. Westin
Assistant Examiner—John R. Lee
Attorney, Agent, or Firm—Banner & Witcoff

[57] ABSTRACT

A device and method is provided for quickly and accurately obtaining surface contour information from an object without the need for precisely aligning and calibrating mechanical structures or optics elements, and without moving parts. In various embodiments, the invention includes steps of projecting a plurality of parallel planes of laser light through a transparent plate onto a surface of the object, receiving a reflection from the object in a digital camera, and performing image processing on the reflected image to reconstruct the three-dimensional surface of the object therefrom. The image processing includes steps of subtracting an image of the object in its non-illuminated state from an image of the object illuminated by the plurality of parallel planes of light, performing a thresholding operation on the subtracted image, and generating a line array containing lines having curvature deformations due to surface deviations on the object. The line array is transformed into a three-dimensional image by applying a transformation matrix previously obtained by processing an image of a calibration gauge placed on the transparent plate. Both single-image and multiple-image projection systems may be implemented.

34 Claims, 16 Drawing Sheets

U.S. PATENT DOCUMENTS

| | | |
|---|---|---|
| 4,647,918 | 3/1987 | Goforth . |
| 4,705,401 | 11/1987 | Addleman et al. . |
| 4,737,032 | 4/1988 | Addleman et al. . |
| 4,745,290 | 5/1988 | Frankel et al. . |
| 4,846,577 | 7/1989 | Grindon . |
| 4,858,621 | 8/1989 | Franks . |
| 4,867,570 | 9/1989 | Sorimachi et al. . |
| 4,871,256 | 10/1989 | Grindon . |
| 5,001,557 | 3/1991 | Begle . |
| 5,025,476 | 6/1991 | Gould et al. . |
| 5,094,538 | 3/1992 | Reedman et al. . |
| 5,128,880 | 7/1992 | White . |
| 5,164,793 | 11/1992 | Wolerberger et al. . |
| 5,195,030 | 3/1993 | White . |
| 5,206,804 | 4/1993 | Thies et al. . |
| 5,216,594 | 6/1993 | White et al. . |
| 5,237,520 | 8/1993 | White . |
| 5,339,252 | 8/1994 | White et al. . |
| 5,361,133 | 11/1994 | Brown et al. ............................ 356/376 |
| 5,457,325 | 10/1995 | Huberty ............................... 250/559.29 |
| 5,477,332 | 12/1995 | Stone et al. ............................... 356/376 |

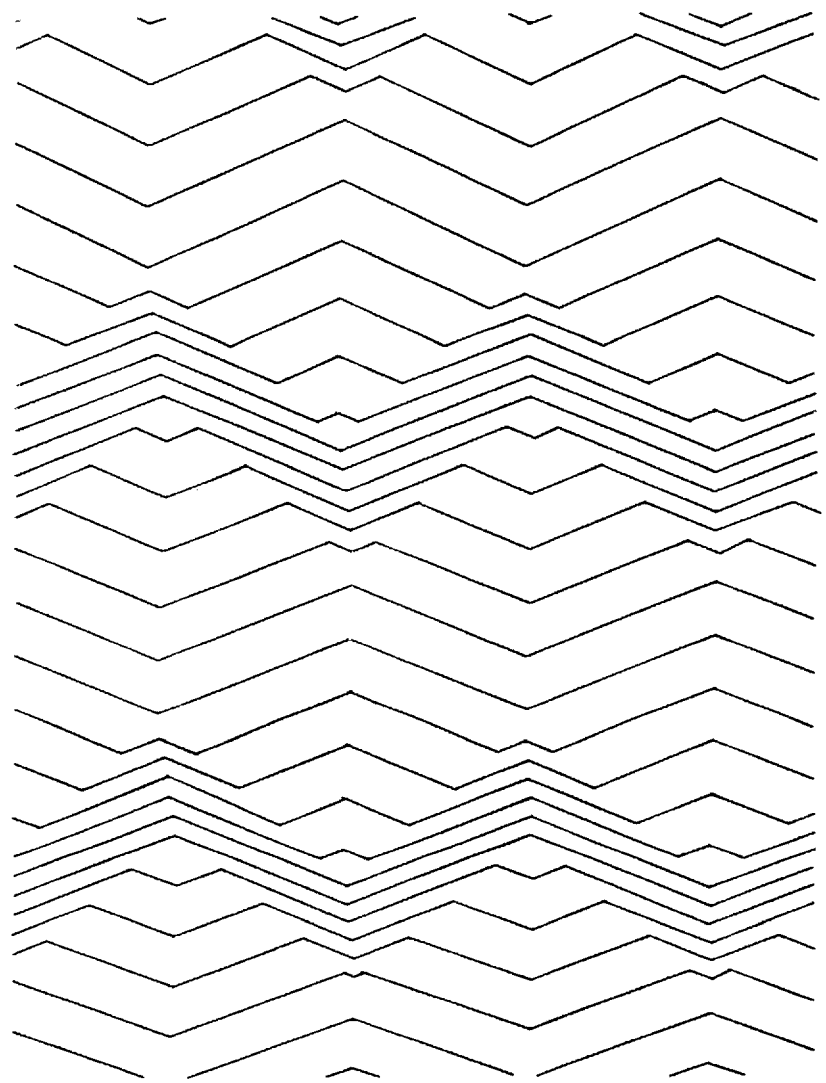

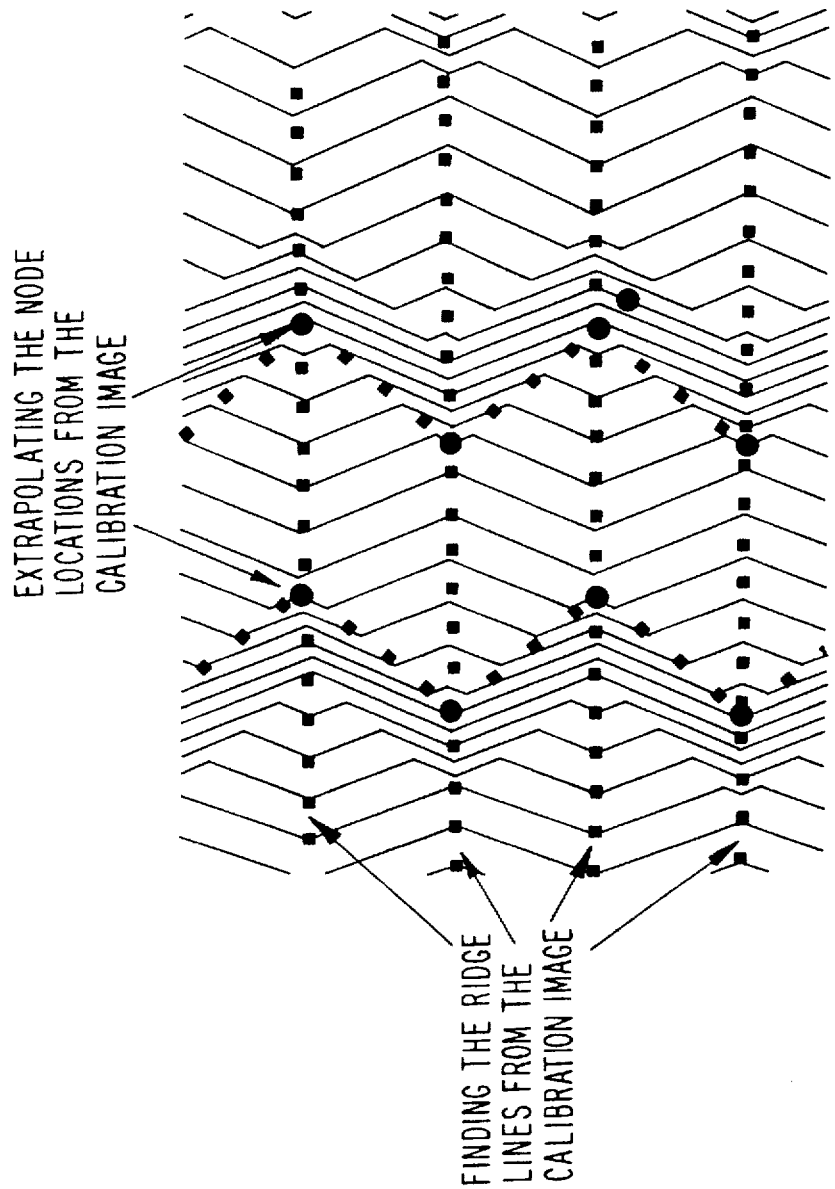

OBJECT IMAGING DEVICE AND METHOD USING LINE STRIPING

This invention was made with Government support under the Prosthetics Research Study awarded by the Department of Veterans Affairs. The Government has certain rights in the invention.

BACKGROUND OF THE INVENTION

1. Technical Field

This invention relates generally to a device for capturing information regarding the surface shape of an object, such as the underside of a human foot or other extremity. More particularly, the invention provides a method and apparatus for projecting a plurality of laser lines onto an object surface, receiving a reflection of the projected lines, and determining a shape of the object based on the curvature of the reflected laser lines.

2. Related Information

There is a need to quickly, accurately, and inexpensively capture information representing the detailed surface contours of various types of objects, such as the underside portion of the human foot. As one example, people with insensate feet—such as those suffering from diabetes—may have difficulty finding shoes which fit properly, creating a need for making such determinations automatically.

Conventional systems for automatically measuring the surface contours of the underside of the human foot, such as described for example in U.S. Pat. No. 4,876,758, involve complicated mechanical structures which are expensive and unreliable, making them infeasible for large-scale commercial use.

Other methods of making custom shoes, such as disclosed in U.S. Pat. No. 4,745,290, involve optical measuring techniques. The latter patent discloses an apparatus for scanning a laser beam point in a predetermined pattern over the side of a foot, receiving the reflected laser point at a position detector, and determining surface coordinates therefrom. The resulting information is then used to form a shoe last. The apparatus requires complicated optical elements which must be properly aligned, synchronized, and adjusted.

Other methods involving optical scanning techniques require that a foot be held stationary for a relatively long period of time—more than a few seconds—increasing the risk that accurate and reproducible measurements will not be easily obtained. Such scanning systems are susceptible to errors in alignment and optical distortion, and most systems disadvantageously employ moving parts.

Accordingly, there remains a need to quickly and accurately measure the surface contours of an object such as the underside of the human foot at low cost.

SUMMARY OF THE INVENTION

It is one object of the present invention to provide an apparatus and method for measuring surface contours which can accommodate for optic nonlinearities by simultaneously projecting a plurality of laser lines across an object surface, receiving a reflection of the projected lines from the surface, determining curvature deformations in the reflected lines with reference to calibration data, and calculating a surface projection based on the determined curvature deformations.

It is another object of the present invention to provide an apparatus and method for quickly determining surface contour information for the underside of a human foot by placing the foot on a transparent plate, projecting a diffracted laser light beam through the transparent plate onto the foot, receiving a reflection of the diffracted light beam in a video camera, and transferring the received video camera image into a computer where the image is further processed to provide the surface contour information.

It is another object of the present invention to provide a method and apparatus for capturing foot contour information using a simple system with few or no moving parts, wherein the foot contour information can be further modified to generate a custom insole using various techniques.

It is yet a further object of the present invention to provide a method and apparatus for capturing object surface information by simultaneously projecting a plurality of laser light planes onto the object surface and receiving a reflection therefrom, wherein the surface information can be obtained very quickly and without the need for using precision optical components or moving parts.

Other features and advantages of the invention will become apparent with reference to the following detailed description, the accompanying figures, and the appended claims.

BRIEF DESCRIPTION OF THE DRAWINGS

FIG. 3D shows a single-camera image of the calibration gauge of FIG. 3C when illuminated by parallel planes of light from a laser light source after background subtraction. FIG. 3E shows how node locations and ridge lines may be extracted from the image of FIG. 3D.

DETAILED DESCRIPTION OF THE PREFERRED EMBODIMENTS

Figure 1:
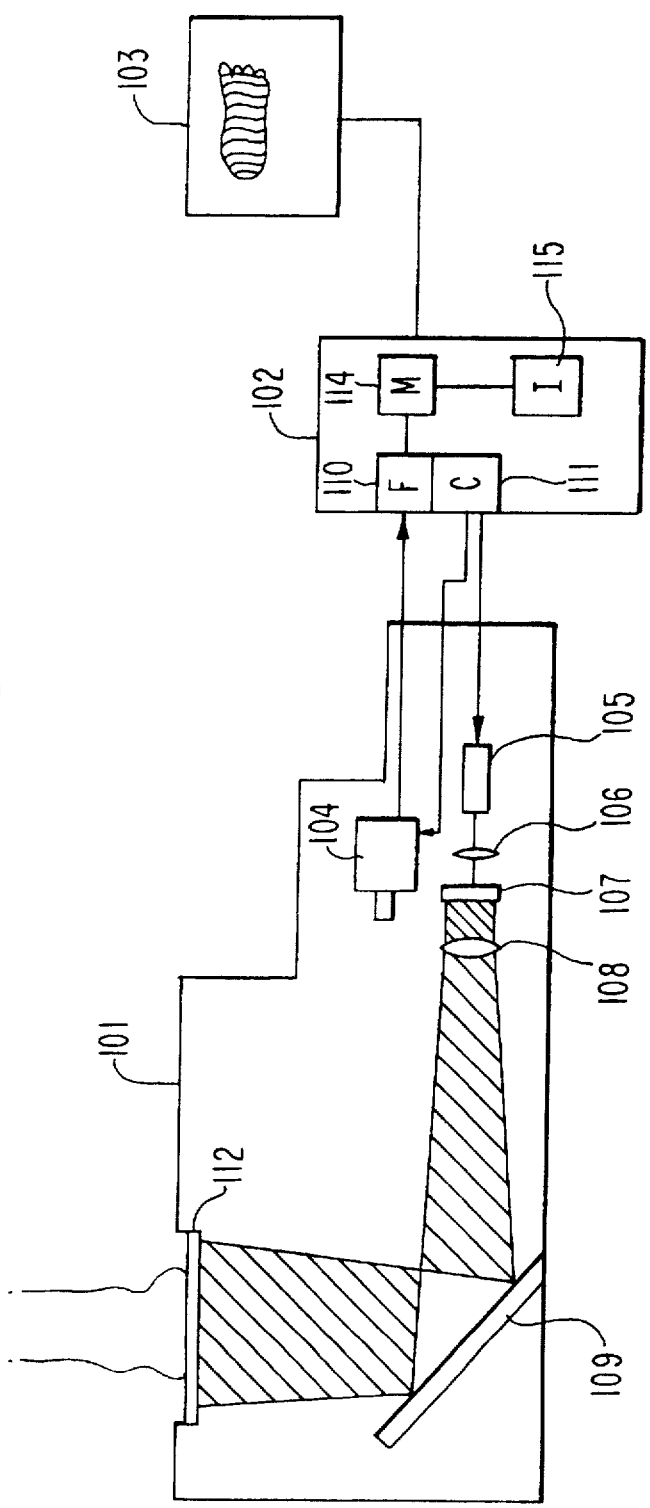
FIG. 1 shows in simplified form a side view of an imaging device according to various embodiments of the invention.

FIG. 1 shows in simplified form a side view of an imaging device according to various embodiments of the invention.

As shown in FIG. 1, a housing 101 containing various optical elements includes a series of steps upon which a person may ascend. The components in housing 101 are coupled to a computer 102 which has an associated display 103. An object such as a person's foot is placed on recessed transparent plate 112 in the top of housing 101, preferably so that the normal weight of the person bears down on the foot. In the view shown in FIG. 1, the person is standing facing into the page and the back of the foot is seen bearing down on transparent plate 112. To enhance image contrast, a light colored sock may be placed over the person's foot prior to placing the foot on recessed plate 112.

A laser 105 is controlled by circuit 111 in computer 102 (the circuit may be implemented as one or more relays activated by digital I/O lines from the CPU in computer 102). Cylindrical lens 107, diffraction grating 106, and imaging lens 108 are disposed to be in the path of light projected from laser 105. Diffraction grating 106 turns a point of light into a series of points, then cylindrical lens 107 turns those points into lines, resulting in a set of parallel lines which are then focused by imaging lens 108 onto the object by way of mirrored surface 109. As shown in FIG. 1, the planes of light will cause plural lines to appear across the width of the foot as depicted on display 103. Each line, although projected in parallel, will appear to be "warped" on the object due to surface curvature on the object.

Mirrored surface 109 is arranged to reflect the plurality of parallel beams through recessed transparent plate 112 and hence onto the underside of the person's foot or other object. The beams are reflected off the underside of the foot to a second mirror (not shown in FIG. 1) which reflects the image from the foot into camera 104. Mirror 109 may be arranged to be underneath recessed transparent plate 112 to one side (away from the page) and angled toward plate 112, while the second mirror, not shown, may be arranged to be underneath plate 112 on the other side (into the page) and also angled toward plate 112. In this manner, mirror 109 is used to project the beams onto plate 112, while the second mirror is used to collect the reflected image for camera 104. In the view shown in FIG. 1, a single plane of light is shown; the parallel planes are "stacked" along a direction leading into the page. Various orientations of the optics elements are of course possible, and the arrangement shown in FIG. 1 is intended to be exemplary.

Although not explicitly shown in FIG. 1, one or more fans may be disposed just above transparent recessed plate 112 to blow air across the plate, preventing fogging of the plate due to condensation caused by a foot.

Camera 104, which may for example comprise a CCD camera, is disposed to receive the reflected beams from the second mirror and transfer the image to frame grabber 110 in computer 102. Computer 102 controls laser 105 and camera 104 through circuit 111, causing the plurality of light planes to be projected, reflected, and captured by camera 104. Under the control of computer 102, the reflected image is captured by camera 104 and stored in memory 114, where it is processed further by image processing software 115 in accordance with the more detailed description contained herein. In various embodiments, a total of 66 parallel lines has been found to provide satisfactory resolution for the purpose of storing surface information on a human foot. Eight-bit grayscale images have been found to provide sufficient pixel contrast in the received images.

Figure 2:
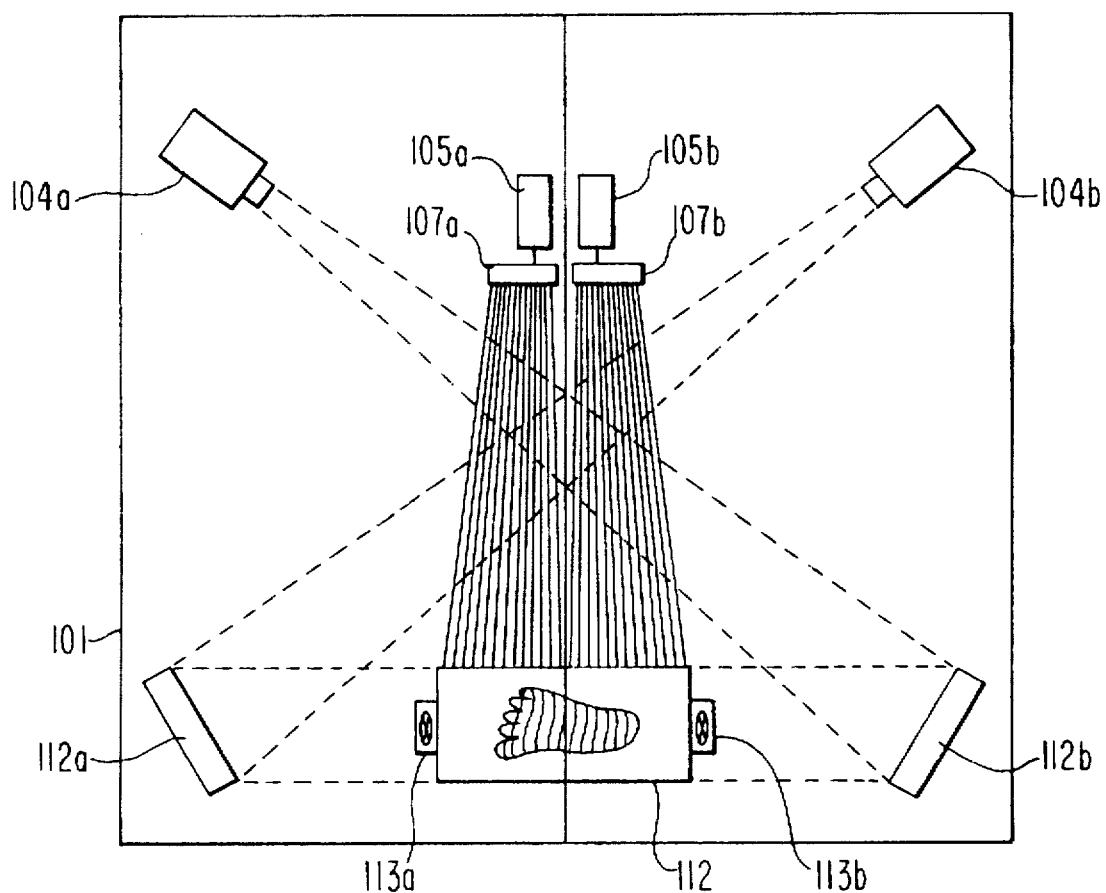
FIG. 2 shows in simplified form a top view of an imaging device according to various embodiments of the invention.

FIG. 2 shows an imaging device according to various other embodiments of the invention. Reference numbers of elements shown in FIG. 2 correspond to similar or identical elements in FIG. 1. In FIG. 2, two lasers 105a and 105b are used to project a plurality of light planes onto transparent plate 112 by reflecting the beams off two mirrors (not shown) disposed beneath transparent plate 112 such that each laser generates beams covering approximately half of the transparent plate. For brevity, certain optical elements of FIG. 1 have been omitted from FIG. 2. Two mirrors 112a and 112b reflect the light beams from the bottom of the foot to two cameras 104a and 104b, respectively. Cameras 104a and 104b are coupled to frame grabber 110 as shown in FIG. 1, and each laser 105 is coupled to control circuit 111 as shown in FIG. 1. With two laser instead of one as shown in FIG. 1, each laser and corresponding optics elements may generate for example 33 parallel lines for a total of 66 parallel lines, with close or overlapping images on transparent plate 112.

For a two-camera embodiment such as that shown in FIG. 2, satisfactory spatial resolution has generally been obtained using VGA graphics components (640×480 pixels), with the 480 pixels being along each parallel line (i.e., across the width of a foot) and the 640 pixels being across the plurality of lines (i.e., the one-half length of transparent plate 112, corresponding to half the length of the foot). In various embodiments, each pixel may represent approximately 0.5 millimeters in the short (480 pixel) dimension. Other resolutions are of course possible, and one of ordinary skill in the art will recognize the various tradeoffs between cost and performance. Moreover, in order to achieve a similar resolution in a single-camera system as shown in FIG. 1, a higher pixel resolution is required from that in which two or more cameras are used. A single frame grabber may be used to capture images from two cameras as explained below with reference to FIG. 5B.

Various dimensions for housing 101 and optical element spacings are of course possible. In one embodiment, a length and width of approximately one meter can be used for the housing, with a height at the top of the steps (FIG. 1) of approximately 500 millimeters. One possible dimension for recessed plate 112 is 368×129 millimeters. Using a 66-line array, the line spacing will be approximately 5.5 millimeters.

As shown in FIG. 2, two fans 113a and 113b may be included to blow air across the recessed plate 112 in order to prevent condensation from forming on the plate.

In general, as shown in FIGS. 1 and 2, when an object such as a human foot is placed on transparent plate 112 and a plurality of parallel laser lines are projected thereon, an image is formed from the reflected lines whereby the reflected lines appear to be curved because of the contours on the surface of the object. This image containing the curved deformations of the parallel lines is captured by camera 104 and stored in computer 102 for further processing as explained in more detail below. The image is generally transformed using calibration data previously obtained through the use of a calibration gauge in order to determine the height of various surface points above transparent plate 112. The height information can be stored into a data structure which can be displayed on display 103 and can be exported for various purposes such as controlling a milling machine to generate a custom insole based on the surface contours of a foot.

The use of calibration data for the cameras and laser to determine surface height information advantageously overcomes problems with optics nonlinearities and other defects in the system, rendering such nonlinearities and defects irrelevant. This avoids the need for precision optical components and/or constant mechanical calibration of the various components.

Figure 3A:
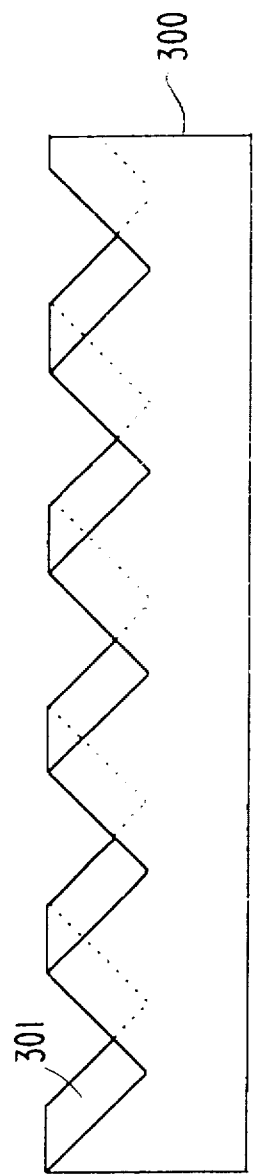
FIG. 3A shows a side view of a calibration gauge which may be used to generate calibration data.
Figure 3B:
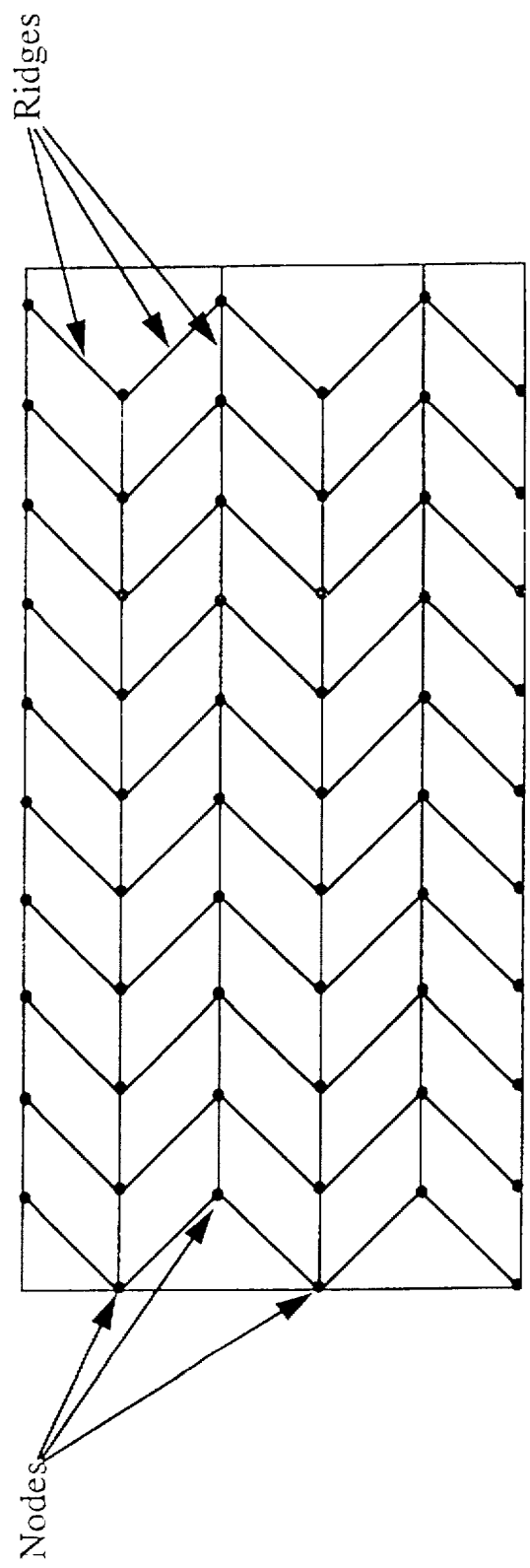
FIG. 3B shows a top view of the calibration gauge of FIG. 3A.

FIG. 3A shows a side view of a calibration gauge 300 which may be used to generate calibration data in accordance with various aspects of the invention. The calibration gauge may be constructed of a solid such as aluminum which has been milled in a sawtooth-type pattern defining a surface 301. FIG. 3B shows a top view of calibration gauge 300, wherein the surface comprises a plurality of nodes (peaks and valleys) and ridges (edges between the peaks and valleys). In various embodiments, calibration gauge 300 is place on transparent plate 112, a plurality of parallel laser light planes is projected thereon, and the resulting image is captured and manipulated as described in more detail below. It is contemplated that the collection of calibration data need only be performed infrequently.

Figure 3C:
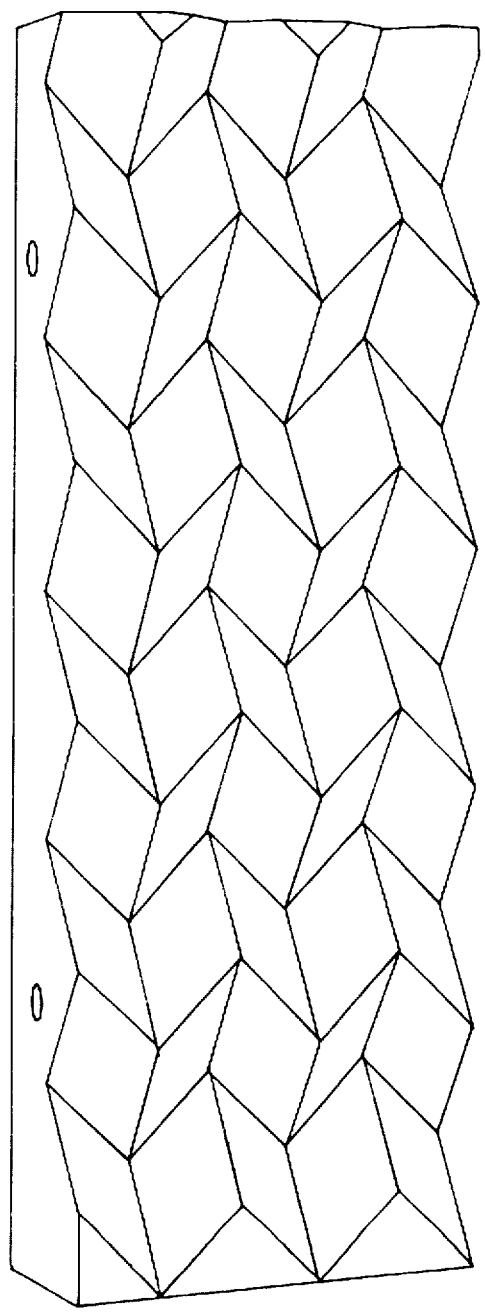
FIG. 3C shows an image of the calibration gauge of FIG. 3B as captured through a digital camera.

FIG. 3C shows an image of the calibration gauge of FIG. 3B as viewed through a digital camera without illumination by the plurality of laser light beams. As can be seen in FIG. 3C, the calibration gauge may be constructed in a manner which forms a series of "mountain slopes" across the face of the gauge. It is preferable to select the spacing of these "slopes" such that at least two lines of light will be projected across each slope. For the exemplary calibration gauge shown in FIG. 3C, for example, a total of 66 laser lines (33 from each laser) were projected across the gauge, each line extending from top to bottom in the figure.

FIG. 3D shows a single-camera (half) image of the calibration gauge of FIG. 3C when illuminated by parallel planes of light. Approximately 30 laser lines are shown.

FIG. 3E shows how node locations and ridge lines may be extracted from the image of FIG. 3D in order to create the calibration data. The process of creating calibration data using the calibration gauge shown in FIG. 3 is described in more detail below.

Figure 4:
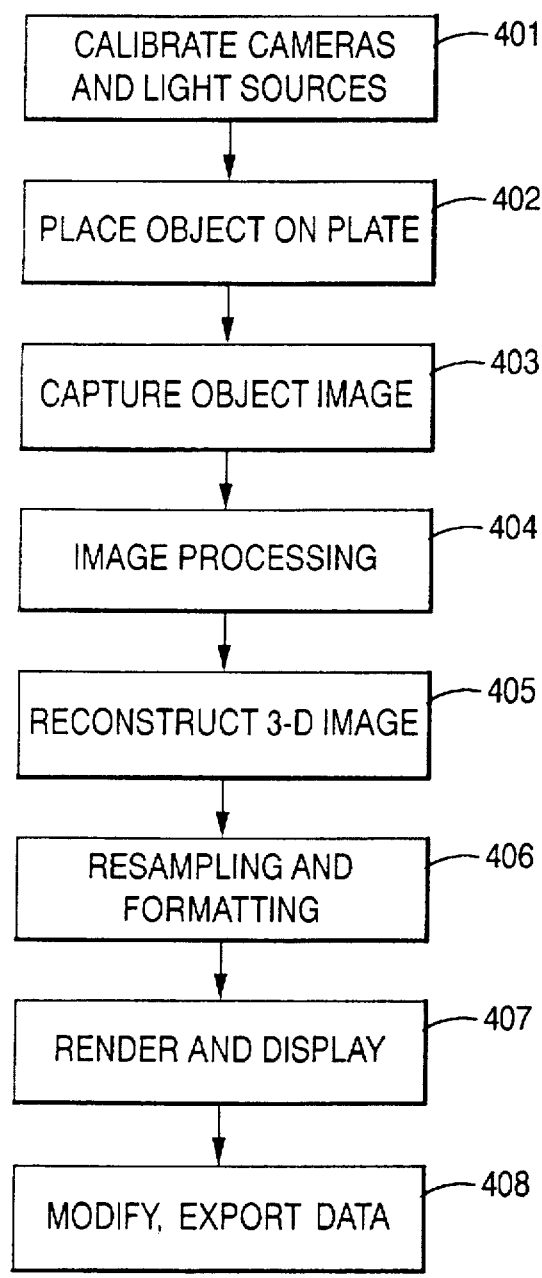
FIG. 4 shows a series of steps which may be carried out to obtain surface contour information of an object in accordance with the principles of the invention.

FIG. 4 shows a sequence of steps for carrying out various aspects of the invention. Details of each step shown in FIG. 4 are described in subsequent figures. It is generally contemplated that the steps shown in FIG. 4 involving image processing, device control, and computation may be performed on computer 102 with memory 114, image processing program 115, and associated display 103.

Beginning with step 401, the calibration data is generated, preferably by placing a calibration gauge such as that shown in FIG. 3 on transparent plate 112, turning on laser 105, and capturing the image in camera 104 for storage in computer 102 via frame grabber 110. Generally, the generation of the calibration image need only be performed once or infrequently; it is not necessary to calibrate prior to capturing surface information for each object. Because the collection of calibration data from calibration gauge 300 is performed in a manner similar to the collection of data from an object placed on transparent plate 112, the latter process will be described first.

In step 402, the object to be measured is placed on transparent plate 112, optionally with fans 113a and 113b turned on to avoid condensation from forming on transparent plate 112.

In step 403, an image of the object is captured by energizing laser 105 to project a plurality of parallel lines thereon, receiving the reflected image in camera 104, and capturing the received image in frame grabber 110 for storage in memory 114. For embodiments corresponding to FIG. 1 in which a single camera is used, step 403 may be carried out in accordance with the steps shown in FIG. 5A (described below). In embodiments corresponding to FIG. 2 in which two or more cameras are used, step 403 may be carried out in accordance with the steps shown in FIG. 5B (described below).

In step 404, the captured image is processed to enhance it through various steps such as ambient (background) light subtraction, pixel thresholding, and line following. These steps are described in more detail with reference to FIG. 6.

In step 405, a three-dimensional image of the object is reconstructed by using the calibration data to calculate the three-dimensional location of each pixel in each line from step 404. This step is described in more detail with reference to FIG. 7A and FIG. 7B.

In step 406, the three-dimensional image of the object may be optionally resampled and reformatted to create a data structure in a desired format. This step is described in more detail with reference to FIG. 8. It should be noted that the "raw" data can be exported in a CAD format or rendered directly, without step 406. Various software programs including CAD/CAM packages can of course be used to further manipulate and visualize this information.

In step 407, the resulting data structure may be used to render a picture of the object using wireframe or other rendering techniques. The object may be displayed on a computer display to allow a technician to monitor the process and to adjust various aspects of the foot measurements, such as modifying the data to improve the comfort of a custom insole to be generated from the data (step 408). Alternatively, the data may be modified automatically in accordance with standard adjustments based on empirical comfort data. The data, whether modified or not, may be exported in any of various formats including CAD/CAM compatible standards, such as DXF or IGES.

Figure 5A:
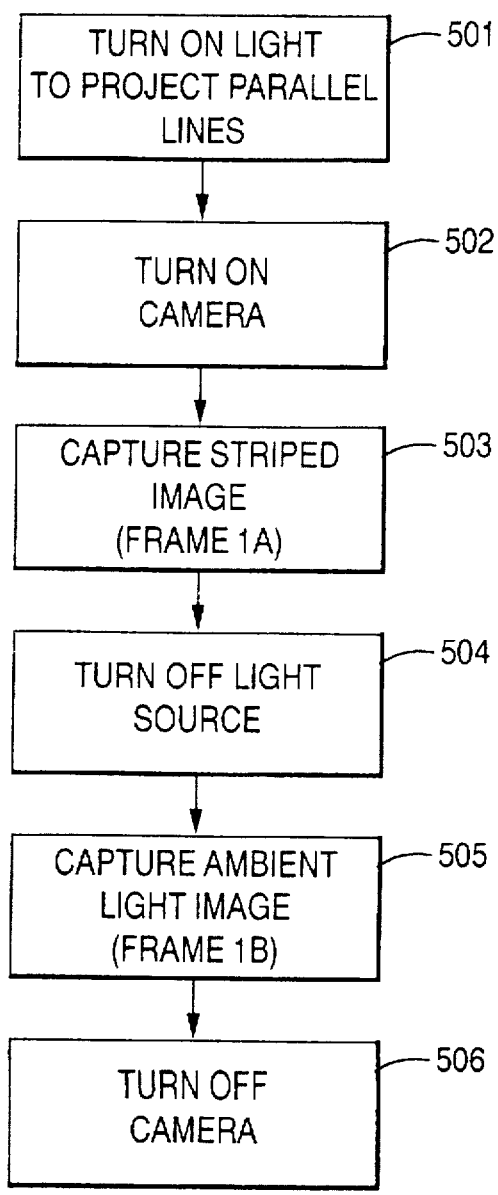
FIG. 5A shows a series of steps which may be carried out to capture an image in a single camera embodiment of the invention.

The following description, with reference to FIGS. 6 through 9, explains in more detail how steps 403 through 407 of FIG. 4 can be carried out. FIGS. 5A and 8A generally pertain to a single-camera/laser embodiment, while FIGS. 5B and 8B generally pertain to a multi-camera/laser embodiment which produces a split image. The remaining figures are generally applicable to all embodiments.

Figure 9C:
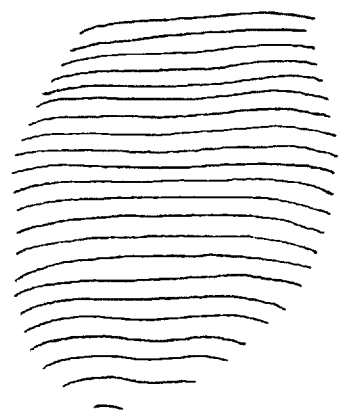
FIGS. 9A–9E show how various portions of an image may appear as an image of an object is processed in accordance with the principles of the invention.
Figure 9B:
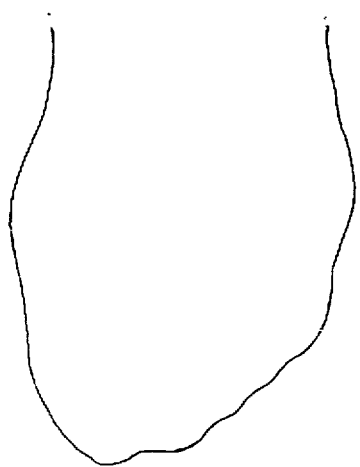
Figure 9A:
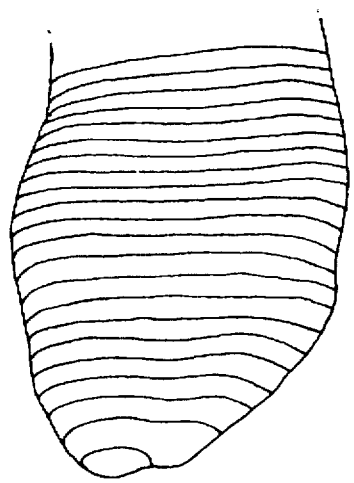

FIG. 5A shows how image capture step 403 of FIG. 4 can be carried out in a single camera/laser embodiment such as that shown in FIG. 1. In step 501, laser 105 is turned on by computer 102 through control circuit 111 to project a plurality of parallel lines through transparent plate 112 and onto an object placed thereon. In step 502, camera 104 is turned on through control circuit 111. In step 503, framegrabber 110 captures and stores an image of the "striped" object (Frame 1A) into memory 114 for further processing as described below. In step 504, the laser is turned off. In step 505, framegrabber 110 captures and stores an image of the object illuminated only be ambient light (Frame 1B). Finally, in step 506, the camera is turned off. The two image frames, Frame 1A corresponding to the object illuminated with striping and Frame 1B corresponding to the object with ambient light, are further processed as described below. FIG. 9A shows a "striped" object image (illuminated by the laser), while FIG. 9B shows an image illuminated by ambient light only.

Figure 5B:
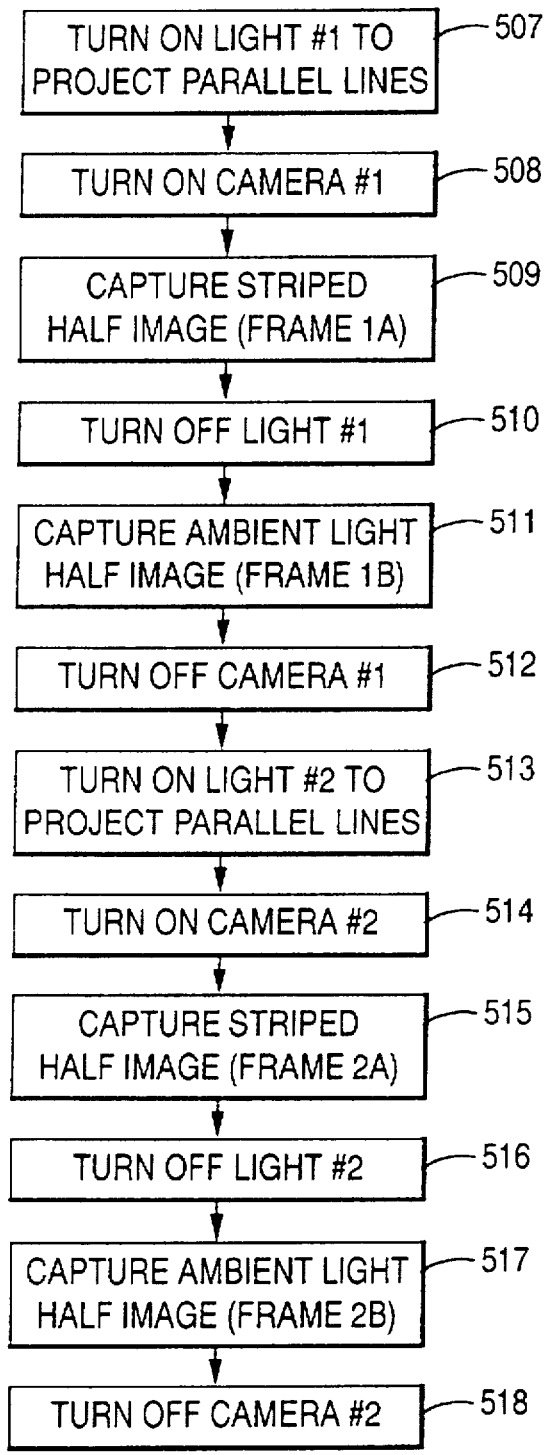
FIG. 5B shows a series of steps which may be carried out to capture an image in a multi-camera embodiment of the invention.

FIG. 5B shows, as an alternative to FIG. 5A, various steps which may be used to capture an image using an embodiment containing two cameras and laser, such as that shown in FIG. 2. In step 507, a first laser is turned on and a first half image is generated by projecting a plurality of parallel lines through approximately half of transparent plate 112. In step 508, a first camera is turned on to receive the first half image. In step 509, framegrabber 110 captures the first half image, generating a first frame of data (Frame 1A) which is stored in memory 114 of computer 102. In step 510, the first laser is turned off, and in step 511, framegrabber 110 captures the first half image without the lines (Frame 1B), which is also stored in memory 114. In step 512, the first camera is turned off.

In step 513, the second laser is turned on and a second half image is generated by projected a plurality of parallel lines through approximately the second half of transparent plate 112. In step 514, a second camera is turned on. In step 515, framegrabber 110 captures the second half image with the striped lines (Frame 2A) and stores this into memory 114. In step 516, the second laser is turned off. In step 517, framegrabber 110 captures the second half image without the lines (Frame 2B), which is also stored in memory 114. Finally, in step 518, the second camera is turned off.

Figure 6A:
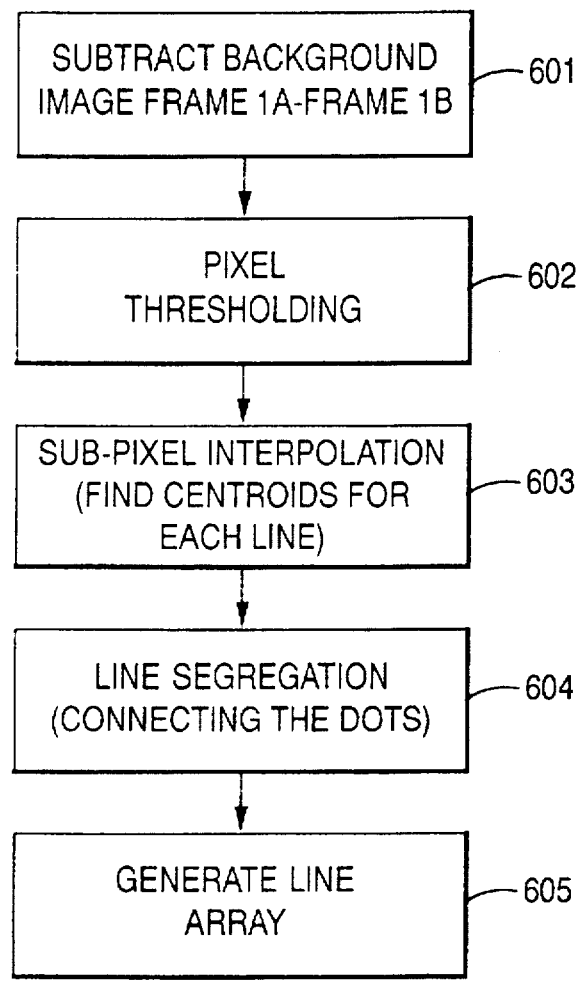
FIG. 6A shows a series of steps for processing an image of an object to enhance it prior to reconstructing lines.

The image processing step 404 of FIG. 4 will now be described in more detail. Referring first to FIG. 6A, a description will be provided for a singlecamera embodiment such as that depicted in FIG. 1. Beginning with step 601, the background image (Frame 1B) without line striping is subtracted from the illuminated image (Frame 1A) captured with the striping to eliminate ambient light from the image. In other words, the value of each pixel in Frame 1B is subtracted from the value of each pixel in Frame 1A to produce a resulting image which eliminates the effects of ambient background light. This process is illustrated in FIG. 9, where FIG. 9A represents an image captured with line striping turned on, FIG. 9B represents an image captured with ambient light only, and FIG. 9C represents the resulting subtraction of the two images. It will be understood that either image (FIG. 9A or FIG. 9B) could be subtracted from the other to accomplish essentially the same result.

Figure 9D:
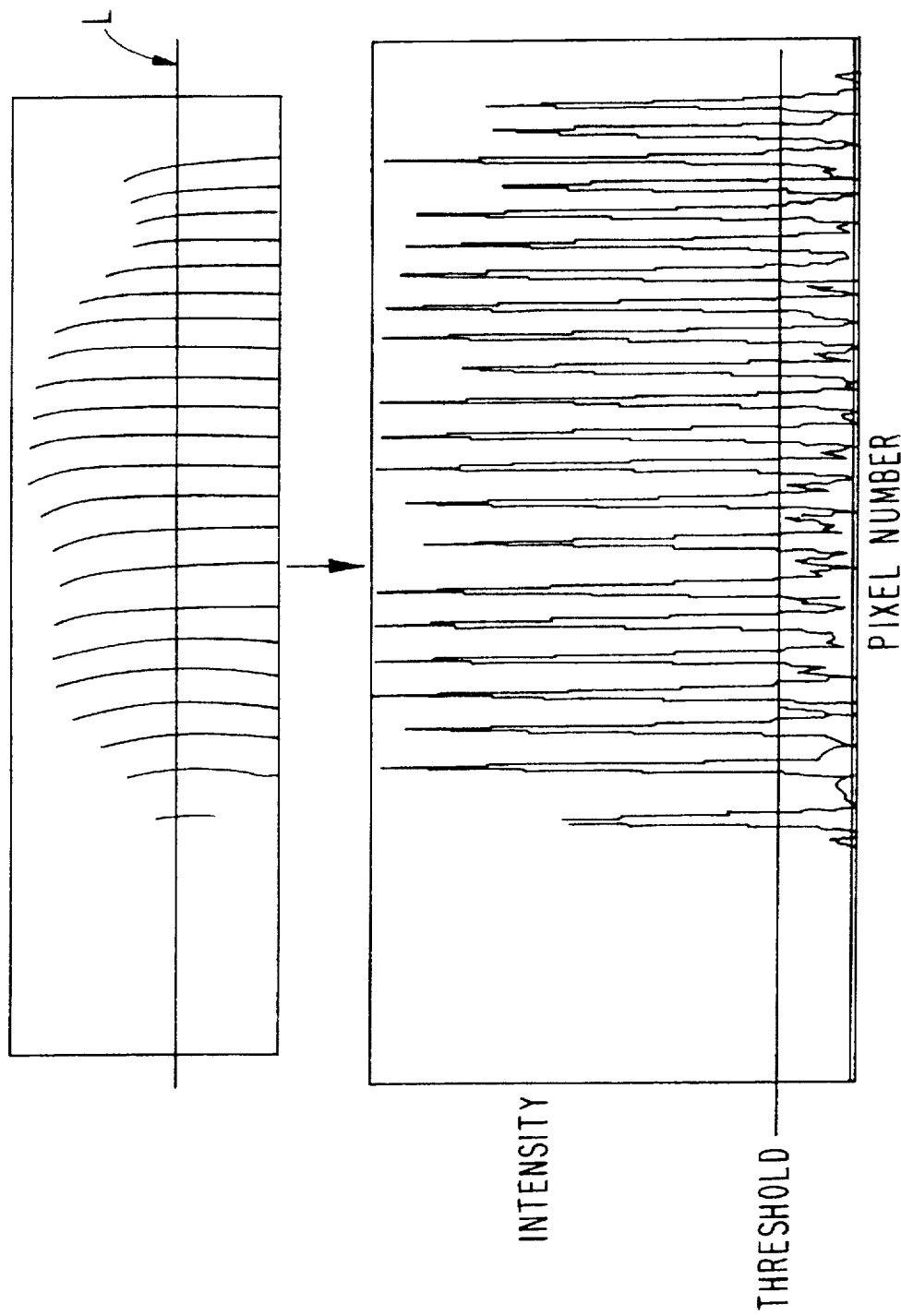
Figure 9E:
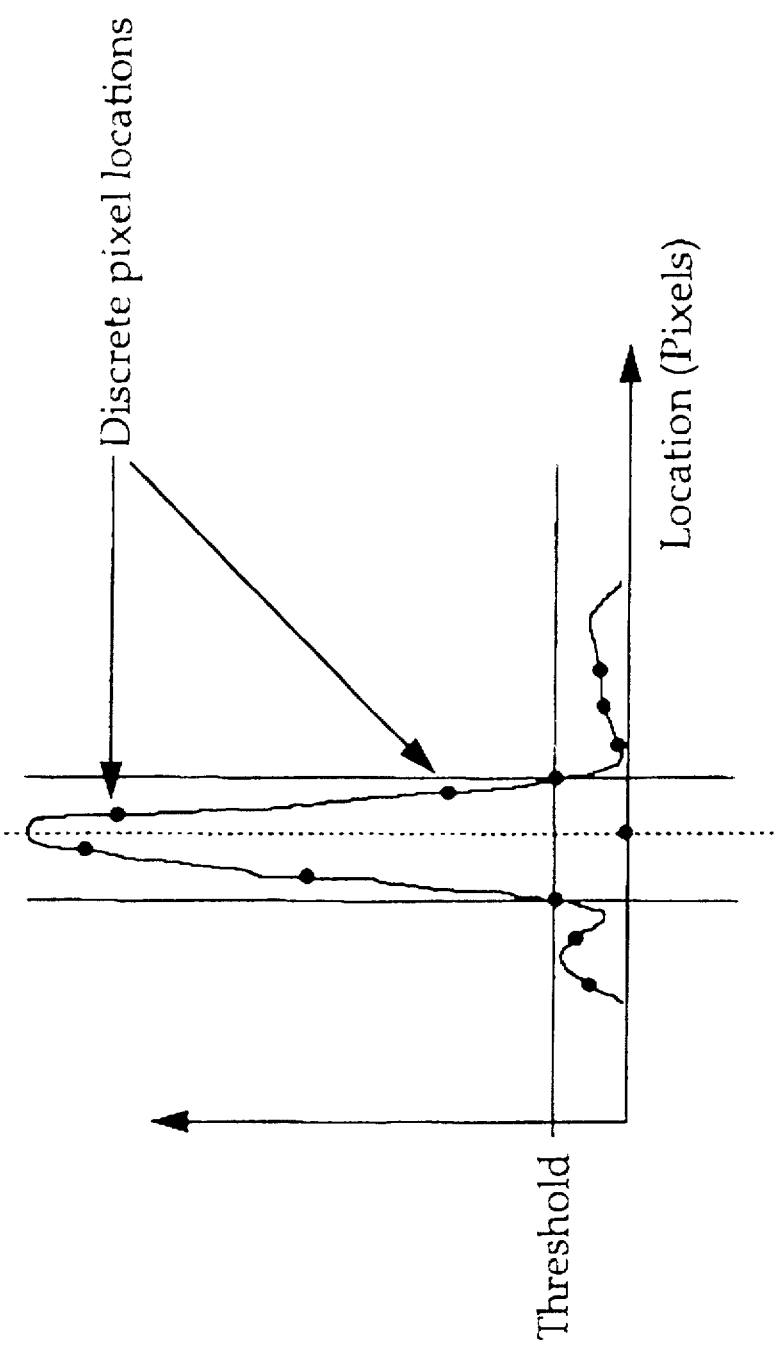

Next, in step 602, a pixel thresholding operation is performed on all pixels in the resulting image to eliminate all but those pixels having values falling above a predetermined level. This level may be user-adjustable, or it may be adaptable based on ambient light level. As shown in FIG. 9D, taking pixel values along a line L in the image, the pixel intensity values will vary from zero (black) to various peaks shown in the bottom of FIG. 9D. All pixel values falling above the threshold are left "on", while those falling below the threshold are zeroed out. This step helps eliminate noise.

In accordance with various embodiments of the invention, in step 603 a sub-pixel interpolation step may be performed. The optical components and spacing may be selected such that the "thickness" of each line of laser light is greater than one pixel, thus allowing resolutions below the one pixel level to be obtained by using pixel intensity information. To accomplish this, in step 603 the centroid of each line is located by moving across the laser lines (i.e., traversing from left to right in the image shown in FIG. 9D). As each pixel value is examined along such a traversal, pixel intensity values will rise near the edge of a line, reach a peak in the middle of the line, and fall off as the line is traversed and the next line is gradually reached (see FIG. 9E). Accordingly, a sub-pixel interpolation is performed to locate the center point of each line along each traversal based on an area under the curve shown in FIG. 9E. In other words, the fuzzy lines are replaced by clear lines by locating, for each group of pixels representing a cross-section of one of the lines, the centroid of the group, and replacing the group with the centroid pixel or pixels. The centroid of each set of pixels (i.e., the pixel which represents the true center of the line) can be calculated based upon a weighted average of pixel intensity. These centroids are then stored in a new array as the center point of each line. Other interpolation techniques besides a weighted average technique may be used, such as for example fitting a Gaussian curve to the intensity data.

In step 604, the individual centroids are grouped into discrete lines by "connecting the dots". The array of centroids is traversed from left to right, middle to top, and then middle to bottom. Line segments are grouped together based on three user-adjustable parameters (minimum line width, minimum spacing between lines, and maximum allowable gaps in lines). These parameters may be empirically determined based on the specific arrangement used (i.e., pixel resolution, number of lines striped, etc.).

Finally, in step 605, a line array is generated containing pixels which are adjacent to each other in the form of striped (but generally curved) lines.

For a multi-camera/laser embodiment, the steps shown in FIG. 6A are repeated for the second image (Frame 2), resulting in a second line array in step 605. Thus, Frame 2B is subtracted from Frame 2A, and steps 602 through 605 are repeated for this additional frame (representing half of the image on transparent plate 112). The resulting second line array, which corresponds to the second half image of the object on transparent plate 112, is processed in the same manner as the first line array, as described below.

Now that the image processing steps have been described, the generation of calibration data will be explained with reference to FIG. 6B. The general concept of calibrating a camera location is well known and is described, for example, in publications such as "Camera Calibration by Vanishing Lines for 3D Computer Vision", by Ling-Ling Wang et al., published in IEEE Transactions on Pattern Analysis and Machine Intelligence, Vol. 13, No. 4 (April 1991), and "Determination of the Attitude of 3-D Objects From a Single Perspective View", by Michel Dhome et al., published in IEEE Transactions on Pattern Analysis and Machine Intelligence, Vol. 11, No. 12 (December 1989), both of which are expressly incorporated by reference herein.

Figure 6B:
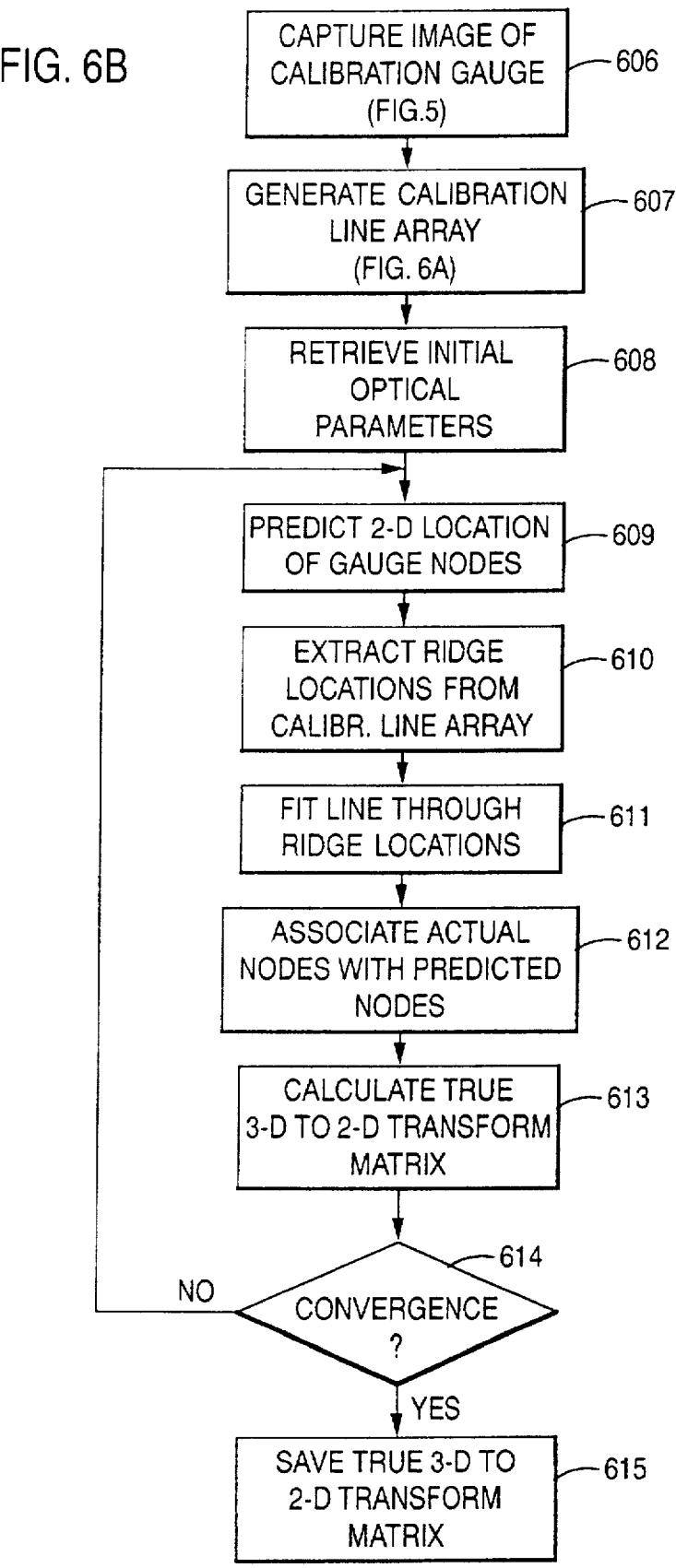
FIG. 6B shows a series of steps for processing an image of a calibration gauge to produce calibration data.

Beginning in step 606 of FIG. 6B, an image of the calibration gauge is captured using either a single camera embodiment (see FIG. 5A) or a multi-camera embodiment (see FIG. 5B). Next, in step 607, a line array for the calibration gauge is generated using the same steps as in FIG. 6A. In other words, a line array is generated for the calibration gauge just as if the gauge itself were an image to be captured and processed.

In step 608, the initial optical parameters for the apparatus are retrieved from a data file or the like. These optical parameters, which need not be precise, may include an initial guess at the camera and laser locations as measured from the apparatus itself. The location data may include three translational coordinates and three rotational coordinates with reference to the back left of transparent plate 112 (in other words, the camera and laser positions in three dimensional space with respect to transparent plate 112). Additionally, the field of view of the camera, the number of active pixels in the field of view, the number of laser lines, the fan angle of the laser and the sweep angle of the lasers as determined by the user are also retrieved. The physical dimensions of the calibration gauge (width, length, size and number of sawtooths along the length of the gauge, and the size and number of sawtooths along the width of the gauge) are also retrieved.

In step 609, the two-dimensional location (i.e., in 2-D camera space) of the calibration gauge nodes (see FIG. 3B) are predicted. This step involves calculating a 3-D object space to 2-D camera space transformation matrix using well known graphics projection techniques, and then applying that matrix to the 3-D object space locations of the nodes of the calibration gauge.

In step 610, the ridge locations (see FIG. 3B) of the calibration gauge are extracted from the calibration line array by finding the inflection points in each line in the calibration line array (see FIG. 3E). In step 611, a line is fit through each of the ridge locations extracted in step 610, and the ridge nodes are calculated as the intersection of two ridge lines (see FIG. 3E).

In step 612, each "actual" node extracted from the calibration line array (step 610) is associated with the closest predicted node on the calibration gauge. In step 613, a "true" 3-D object space to 2-D camera space transformation matrix is calculated using data from the calibration line array. In other words, given a known set of X, Y, and Z locations in space and an associated set of x, y locations on the screen, one can solve for the transformation matrix that converts the locations in space to the location on the screen.

In step 614, it is determined whether the transformation matrix has converged (i.e., whether the changes from the previous matrix are small). If convergence has been reached, then the transformation matrix is saved in step 615. On the other hand, if variations in the matrix are still relatively large, the process repeats back at step 609 after adjusting the matrix. Each time through the fitting process, the matrix including the camera location, etc. is adjusted so that it fits the data better. Numerical methods typically cannot produce the exact solution the first time, but need to iterate around the solution. Each "guess" is refined until the fit is as good as possible. Details of this well-known process are not described here. The convergence point can be set empirically or it can be set to an arbitrary value.

Figure 7A:
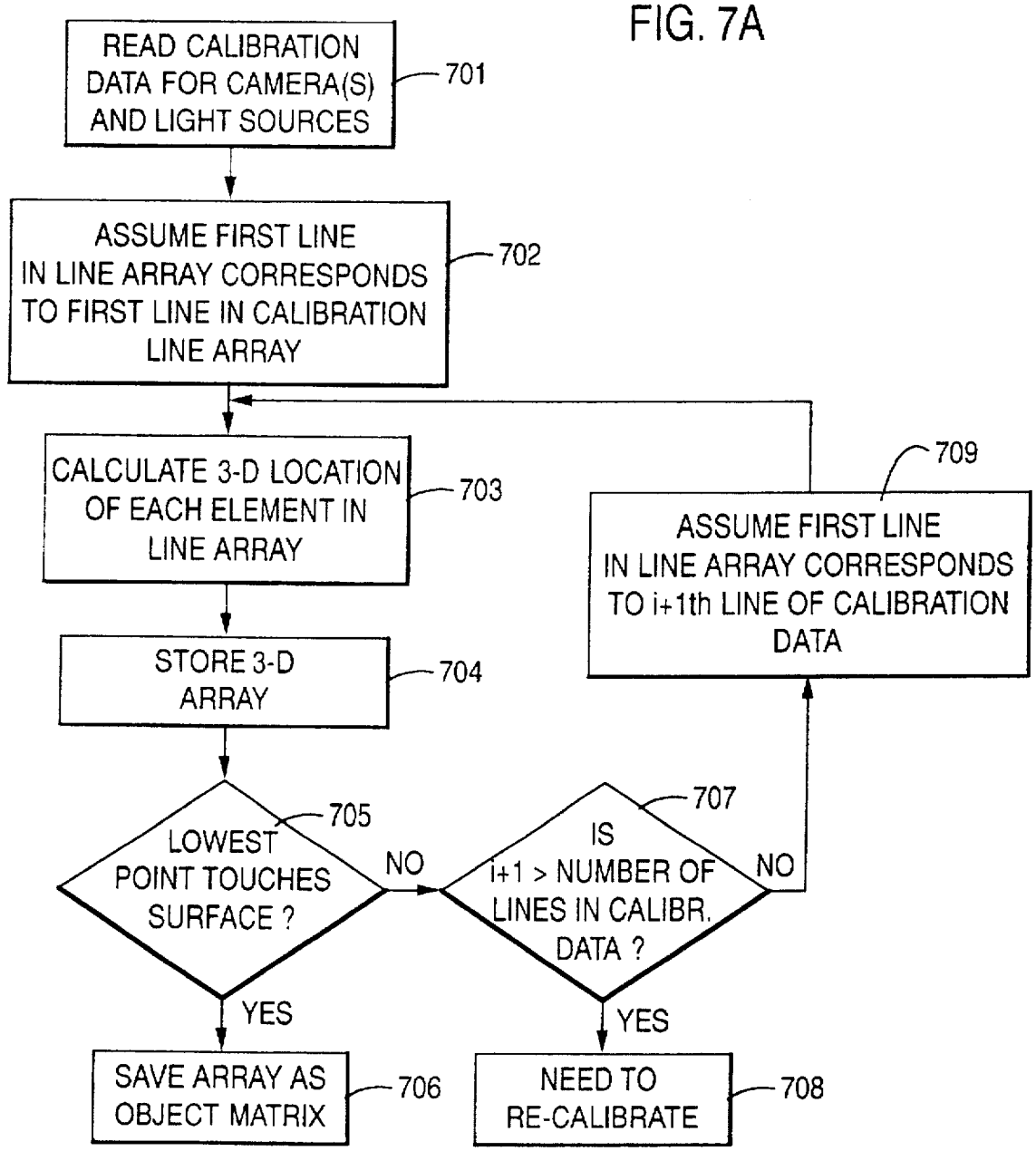
FIG. 7A shows various steps which may be performed to generate an object matrix from an enhanced image.
Figure 7B:
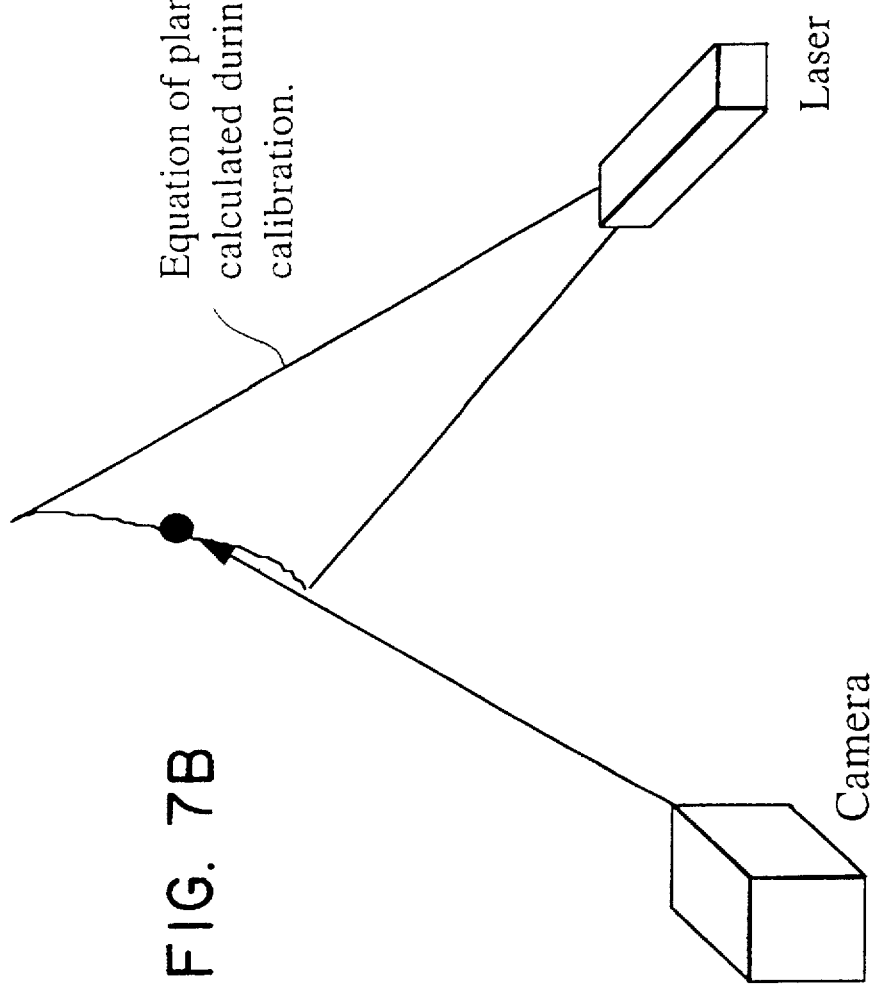
FIG. 7B shows various principles involved in the steps shown in FIG. 7A.

FIG. 7A shows in more detail how image reconstruction step 405 of FIG. 4 can be carried out, using the calibration data developed in accordance with FIG. 6B. (For split images such as those produced from a multi-camera embodiment, the steps in FIG. 7A are carried out independently for each portion of the image or line array). In summary, using the calibration line array (see step 607 of FIG. 6B), the 3-D to 2-D transformation matrix (see step 615 of FIG. 6B), the laser calibration data, and the calibration gauge size and shape information, the problem is to find the equation of the plane (in 3-D object space) that best fits the data from the calibration line array. This general process can be visualized in FIG. 7B, which shows that the intersection of a plane and a vector not lying in that plane is a unique point. The equation for the camera vector is determined from the image location in camera space and the 2-D to 3-D object space transformation calculated during the calibration process (see step 615 of FIG. 6B). For example, with the first line in the object line array, one can take the 2-D camera data describing that line and project that line into 3-D object space using the knowledge of the calibration gauge and the 3-D to 2-D transformation matrix. The latter is invertible, so one can move from either 3-D to 2-D or vice versa. Using the positional information of the laser as initial conditions for an iterative solution, a least squares method is used to calculate the equation of a plane. This plane of light is the only plane that could originate from the laser and create the first line in the calibration line array. This same process is continued for the rest of the lines in the object array. The equation is then saved for each laser plane.

Beginning in step 701, the calibration data is read into memory. It is contemplated that this data was generated in accordance with FIG. 6B as described previously. In step 702, it is assumed that the first line in the captured object line array (see step 605 of FIG. 6A) corresponds to the first line in the calibration line array. For example, it is assumed that the left-most line in the image shown in FIG. 9D would correspond to the left-most line shown in FIG. 3E.

In step 703, the 3-D location of each element (pixel) in the image line array is calculated by applying the 2-D to 3-D transformation matrix. In step 704, the result is stored in a 3-D array. In step 705, it is determined if the lowest point of the 3-D array touches the surface. This is done by testing to determine whether the lowest point in the array is deemed to be close enough to the surface of the transparent plate, based upon a user defined threshold. If the lowest point is determined to touch the surface of transparent plate 112, then in step 706 the 3-D array is saved as the object matrix, which contains information indicating the surface heights along each line. If the lowest point is "impossibly" too high (i.e., no points of the object are determined to be actually touching the surface or are low enough), then in step 707 a check is made to see if there are more lines available in the calibration line array. If the number of lines in the calibration line array has been exceeded, then in step 708 a message is generated indicating that re-calibration is necessary (i.e., none of the results is valid).

If, in step 707, there are more lines available in the calibration line array, then in step 709 it is assumed that the first line in the object line array corresponds to the next available line (the i+1th line) in the calibration line array, and the process repeats at step 703. This process repeats until a proper solution results (i.e., at least one point in the object line array corresponds to Z=0 on the transparent plate). At that point, in step 706, the resulting three-dimensional array is saved as the object matrix. As described above, for a multi-camera embodiment, two such matrices would be produced, each corresponding to a half image of the object on transparent plate 112.

Generally, if there are for example 66 lines in the calibration image, there will also be 66 lines in the object line array. However, because the object may not be as long as the calibration gauge, fewer than 66 lines may appear in the line array. In this case, "impossible" matches between the image line array and the calibration line array will occur. All such impossible solutions will be discarded and the process will repeat (see step 707) until a suitable solution is found.

Figure 8A:
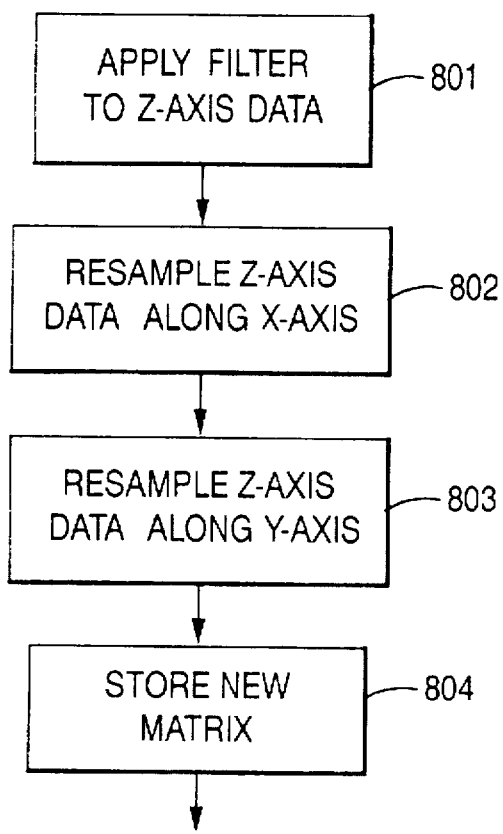
FIG. 8A shows steps which may be performed to resample and reformat an object matrix for rendering or further processing in a single-camera/laser embodiment.

FIG. 8A shows how the object matrix produced from the steps of FIG. 7A may be resampled and reformatted to provide more useful information for rendering and subsequent use. Beginning in step 801, a filter (such as a 4-wide weighted average "tent" filter) may be optionally applied to the Z-axis data in the object matrix in order to remove high frequency noise. In step 802, the Z-axis data is resampled along the X axis using a user-specified frequency. This step may be carried out using any of various interpolation techniques (linear, spline, polynomial, etc.). In step 803, the Z-axis data is resampled along the Y axis using a user-specified frequency. Steps 802 and 803 may be reversed in order.

Finally, the resulting resampled data is saved as the new object matrix in step 804. This resulting matrix may be rendered and displayed using well-known techniques. Moreover, the matrix may be modified in accordance with empirical or technician-directed modification information to produce a comfortable or therapeutic insole.

Figure 8B:
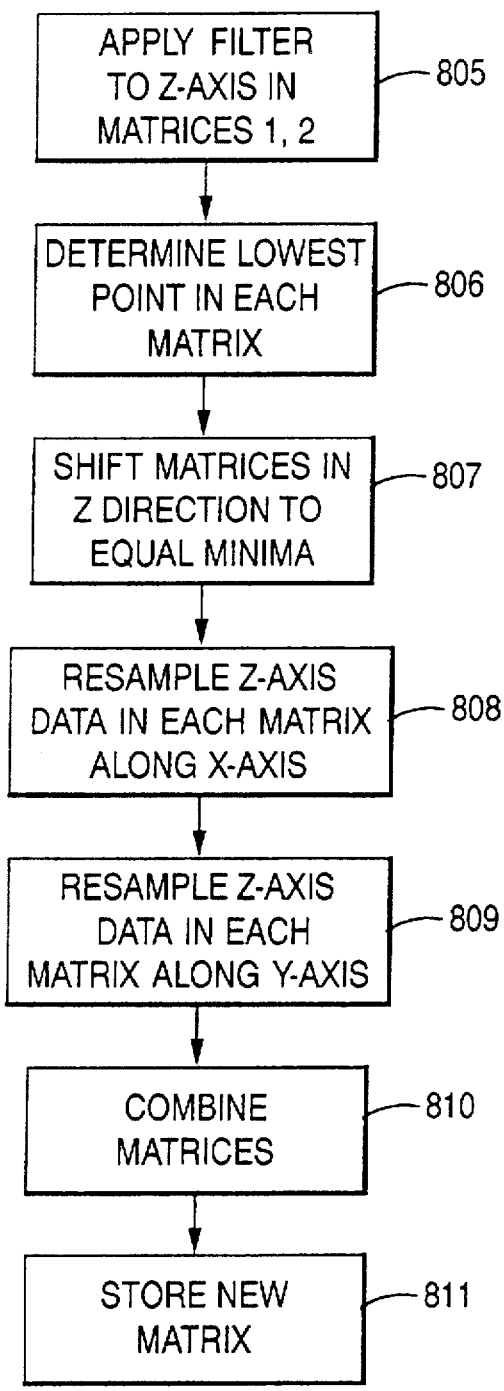
FIG. 8B shows various steps which may be performed to resample and reformat an object matrix including additional steps for registering and combining a split image produced from a multi-camera multi-laser embodiment.

FIG. 8B shows various steps which may be performed to resample and reformat two matrices which are produced by a multi-camera/laser embodiment. As explained above, it is assumed that two separate object matrices, each corresponding to a portion of the entire object on transparent plate 112, are generated. Beginning in step 805, a filter may optionally be applied separately to the Z-axis data in each matrix to eliminate high frequency noise. In step 806, the lowest point in each matrix is determined. In step 807, each matrix is shifted in the Z direction to equalize the minima in each matrix. In step 808, the Z-axis data in each matrix are resampled along the X axis according to a user-specified frequency. In step 809, the Z-axis data are resampled along the Y axis according to a user-specified frequency. Steps 808 and 809 may be reversed in order.

In step 810, the two matrices are combined into a single matrix, and in step 811 the combined image is saved as a new matrix. The resulting matrix may be stored in a memory in computer 102 in any of various formats, such as DXF Autocad format. This information may then be used to program a CNC machine to create a custom insole matching the measured contours of the foot.

Thus has been described an apparatus and method for quickly capturing surface contour information of an object placed above a transparent surface using a line striping technique. The present invention can be used in many different applications beyond the automatic measurement of feet. As one example, the invention may be used to generate a custom mask corresponding to an image of a person's face. It is apparent that many modifications and variations of the present invention are possible, and references to specific values are by example only. The method steps of the invention may be practiced in a different ordered sequence from that illustrated without departing from the scope of the invention. It is, therefore, to be understood that within the scope of the appended claims the invention may be practiced otherwise than as specifically described.

We claim:

1. Apparatus for measuring the surface geometry of an object, comprising:

a housing having a transparent plate;

light projection means, disposed in the housing, for generating and simultaneously projecting a plurality of parallel lines of light onto the object through the transparent plate;

image capture means, disposed to receive a reflection of the projected plurality of parallel lines from the object, for capturing the reflection and storing a digital representation thereof into a computer memory; and means for controlling the light projection means and the image capture means to separately capture first and second images, the first image comprising an image of the object with the light projection means activated to produce the plurality of parallel lines of light, the second image comprising an image of the object with the light projection means deactivated so that the object is illuminated only with ambient light.

2. The apparatus of claim 1, further comprising image processing and reconstruction means, coupled to the image capture means, for generating a three-dimensional representation of a surface of the object by transforming the digital representation using data generated from a calibration gauge.

3. The apparatus of claim 2, wherein the image processing and reconstruction means comprises:

means for producing a subtracted image by subtracting the first and second images; and means for performing a sub-pixel interpolation operation on the subtracted image in order to locate center points of each of a plurality of image lines in the subtracted image, and producing thereby a line array comprising the center points.

4. The apparatus of claim 2, wherein the image processing and reconstruction means comprises:

means for producing a line array from the digital representation, the line array comprising a plurality of image lines each corresponding to one of the parallel lines of light; and means for generating the three-dimensional representation by applying 2-D to 3-D transformation data to the line array.

5. The apparatus according to claim 2, further comprising means for rendering the three-dimensional representation on a computer display.

6. The apparatus of claim 2, wherein the image processing and reconstruction means comprises:

means for producing a subtracted image by subtracting the first and second images;

means for performing a thresholding operation on the subtracted image and producing a thresholded image; and means for generating a line array of pixels corresponding to lines reflected off the object from the thresholded image.

7. The apparatus of claim 6, wherein the image processing and reconstruction means comprises means for transforming the line array of pixels into the three-dimensional image by applying a transformation matrix created by capturing an image of a calibration gauge placed on the transparent plate.

8. The apparatus of claim 7, further comprising means for resampling the three-dimensional image according to a user-specified frequency and storing the result thereof into a data structure.

9. The apparatus of claim 1, wherein the housing comprises a step for allowing a person to climb atop the housing, wherein the transparent plate is disposed in the top of the housing and is of a size selected to encompass a human foot, and wherein the light projection means projects approximately 66 parallel lines of light through the transparent plate.

10. The apparatus of claim 1, wherein the light projection means comprises:

a laser for generating a beam of coherent light;

beamsplitting means, disposed in an optical path of the laser, for splitting the beam of coherent light into the plurality of parallel lines of light;

a lens, disposed in an optical path of the beamsplitting means, for focusing the plurality of parallel lines of light; and a mirror, disposed in an optical path of the lens, for reflecting the focused plurality of parallel lines of light toward the transparent plate.

11. The apparatus of claim 1, wherein the light projection means comprises a first light source for generating a first portion of the plurality of parallel lines of light and a second light source for generating a second portion of the plurality of parallel lines of light; and wherein the image capture means comprises a first camera for capturing a first portion of the reflection and a second camera for capturing a second portion of the reflection.

12. The apparatus of claim 1, further comprising a fan coupled to the housing and disposed to blow a stream of air across the transparent plate to prevent condensation from forming thereon.

13. The apparatus of claim 1, further comprising a calibration gauge, having a shape adapted to be placed on the transparent plate, wherein the image capture means captures and stores a digital representation of a reflection of the calibration gauge.

14. A method of measuring the surface geometry of an object, comprising the steps of:
  (1) placing the object onto a transparent plate;
  (2) generating and simultaneously projecting a plurality of parallel lines of light onto the object through the transparent plate;
  (3) capturing an image corresponding to a reflection of the projected plurality of parallel lines from the object; and
  (4) storing a digital representation of the captured image into a computer memory by separately capturing first and second images, the first image comprising an image of the object while illuminated by the plurality of parallel planes of light, the second image comprising an image of the object illuminated with only ambient light.

15. The method of claim 14, further comprising the step of blowing a stream of air across the transparent plate to prevent condensation from forming thereon.

16. The method of claim 15, further comprising the step of:
  (5) generating a three-dimensional representation of a surface of the object by transforming the digital representation using data generated from a calibration gauge.

17. The method of claim 16, wherein step (5) comprises the steps of:
  (a) producing a subtracted image by subtracting the first and second images; and
  (b) performing a sub-pixel interpolation operation on the subtracted image in order to locate center points of each of a plurality of image lines in the subtracted image, and producing thereby a line array comprising the center points.

18. The method of claim 16, wherein step (5) comprises the steps of:
  (a) producing a line array from the digital representation, the line array comprising a plurality of image lines each corresponding to one of the parallel lines of light; and
  (b) generating the three-dimensional representation by applying 2-D to 3-D transformation data to the line array.

19. The method of claim 16, further comprising the step of rendering the three-dimensional representation on a computer display.

20. The method of claim 16, wherein step (5) comprises the steps of:
  (a) producing a subtracted image by subtracting the first and second images;
  (b) performing a thresholding operation on the subtracted image and producing a thresholded image; and
  (c) generating a line array of pixels corresponding to lines reflected off the object from the thresholded image.

21. The method of claim 20, further comprising the step of:
  (d) transforming the line array of pixels into the three-dimensional image by applying a transformation matrix created by capturing an image of a calibration gauge placed on the transparent plate.

22. The method of claim 21, further comprising the step of resampling the three-dimensional image according to a user-specified frequency and storing the result thereof into a data structure.

23. The method of claim 21, further comprising the step of exporting the three-dimensional image in a CAD/CAM format.

24. The method of claim 21, further comprising the step of modifying the three-dimensional image in accordance with shoe insole parameters.

25. The method of claim 14, further comprising the step of providing a housing having a step for allowing a person to climb atop the housing, and
  wherein step (1) comprises the step of using a transparent plate disposed in the top of the housing of a size adapted to encompass a human foot, and
  wherein step (2) comprises the step of projecting approximately 66 parallel lines of light through the transparent plate.

26. The method of claim 14 wherein step (2) comprises the steps of:
  (a) using a laser to generate a beam of coherent light;
  (b) using a beamsplitter, disposed in an optical path of the laser, for splitting the beam of coherent light into the plurality of parallel lines of light;
  (c) using a lens, disposed in an optical path of the beamsplitter, for focusing the plurality of parallel lines of light; and
  (d) using a mirror, disposed in an optical path of the lens, for reflecting the focused plurality of parallel lines of light toward the transparent plate.

27. The method of claim 14,
  wherein step (2) comprises the step of using a first light source for generating a first portion of the plurality of parallel lines of light and a second light source for generating a second portion of the plurality of parallel lines of light; and
  wherein step (3) comprises the step of using a first camera for capturing a first portion of the reflection and a second camera for capturing a second portion of the reflection.

28. The method of claim 14, further comprising the steps of, prior to step (1):
  (a) placing a calibration gauge onto the transparent plate;
  (b) capturing an image of the calibration gauge while illuminated by a plurality of parallel lines of light; and
  (c) processing the captured image of the calibration gauge to produce a transformation matrix used for converting the digital representation stored in step (4) into a three-dimensional representation of a surface of the object.

29. The method of claim 14, wherein step (1) comprises the step of placing a human foot onto the transparent plate.

30. Apparatus for measuring the surface geometry of an object, comprising:
  a housing having a transparent plate;
  a light source which generates a beam of light;
  a beamsplitter, disposed between the light source and the transparent plate, which splits the beam of light into a plurality of parallel lines of light which are transmitted through the transparent plate and reflected onto the surface of an object placed on the transparent plate;
  a camera positioned to receive a reflection of the surface of the object including the parallel lines of light as reflected from the surface of the object;
  a light control circuit coupled to the light source which alternately energizes and de-energizes the light source to alternately illuminate and darken the object, and creating thereby a first illuminated image of the object including the reflected parallel lines of light and a second non-illuminated image of the object; and
  a computer, coupled to the camera, which receives and stores the first illuminated image and the second non-illuminated image of the object from the camera, generates a subtracted image comprising a difference between the first illuminated image and the second non-illuminated image, and converts the subtracted image into a data structure representing height information.

31. The apparatus of claim 30, wherein the computer converts the subtracted image into the data structure by segregating portions of the subtracted image into contiguous line segments and reconstructing height information from the contiguous line segments by applying a transformation matrix which incorporates calibration data previously generated through the use of a three dimensional calibration gauge.

32. The apparatus of claim 30, wherein the computer performs a sub-pixel interpolation operation on the subtracted image and generates therefrom a line array comprising center points for a plurality of image lines, each image line corresponding to one of the plurality of parallel lines projected onto the surface of the object.

33. The apparatus of claim 30, wherein the light source comprises a laser; and wherein the beamsplitter comprises a diffraction grating.

34. The apparatus of claim 30, wherein the light control circuit is coupled to the computer, wherein the computer controls the light control circuit to alternately energize and de-energize the light source in synchronization with successive frames of data captured by the camera.

* * * * *